UNITED STATES PATENT OFFICE.

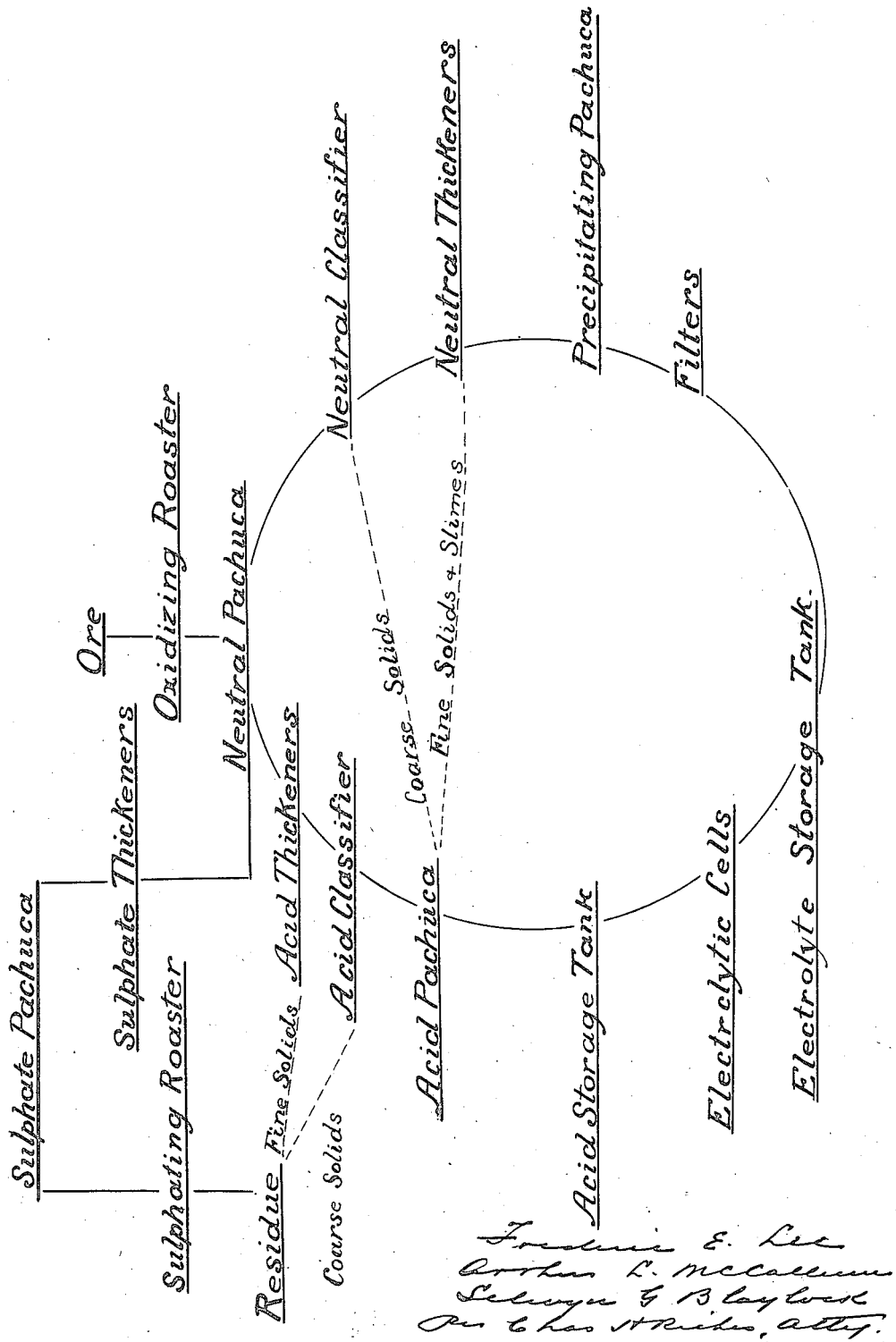

FREDERICK ERIC LEE, ARTHUR LIONEL McCALLUM, AND SELWYN GWILLYM BLAYLOCK, OF TRAIL, BRITISH COLUMBIA, CANADA, ASSIGNORS TO THE CONSOLIDATED MINING & SMELTING COMPANY OF CANADA, LIMITED, OF MONTREAL, QUEBEC, CANADA, A CORPORATION OF CANADA.

PROCESS FOR THE EXTRACTION OF ZINC.

1,399,020. Specification of Letters Patent. Patented Dec. 6, 1921.

Application filed April 30, 1920, Serial No. 377,935. Renewed July 22, 1921. Serial No. 486,803.

*To all whom it may concern:*

Be it known that we, FREDERICK ERIC LEE, ARTHUR LIONEL McCALLUM, and SELWYN GWILLYM BLAYLOCK, British subjects, residing at city of Trail, in the district of Kootenay and Province of British Columbia, Dominion of Canada, have invented a new and useful Process for the Extraction of Zinc; and we hereby declare the following is a full, clear, and exact description of the same.

Our invention relates to a process for the extraction of zinc from minerals, ores, concentrates, and residues, containing oxidized zinc values soluble and/or insoluble in dilute sulfuric acid, ($H_2SO_4$),—the object of our invention being to so treat these minerals, ores, concentrates and residues, that all of the zinc content may be rendered soluble in dilute sulfuric acid, ($H_2SO_4$), and/or water.

In carrying out this object, where necessary, we first heat the mineral, ore, concentrate, or residue, in an oxidizing atmosphere, to a temperature up to 1400° F, which for convenience may be termed the "oxid roast", to convert as much as possible of the zinc values into zinc compound soluble in dilute sulfuric acid, and then by any standard method of hydrochemical extraction, we recover this soluble zinc.

The residue containing zinc compounds, in combinations such as, zinc ferrite, zinc ferrate, zinc silicate and spinel, insoluble in dilute sulfuric acid and/or water is heated in a sulfating atmosphere, which may be water vapor and sulfur dioxid and oxygen, or sulfur dioxid and air, to a temperature which will convert the zinc in these insoluble combinations into soluble zinc compounds and then leached in water, or in the neutralized solution from the leaching of the zinc oxid. During the heating of the residue in the sulfating atmosphere, which, for convenience, may be termed the "sulfate roast", the ferric oxid present acts as a catalyst and hastens the reaction between the sulfur dioxid ($SO_2$) and oxygen to form sulfur trioxid ($SO_3$) which, in turn, combines with the zinc oxid and forms zinc sulfate, thereby breaking up the iron compound of zinc and rendering the zinc, which was previously in a compound, insoluble in dilute sulfuric acid, soluble in this solution and/or water, and at the same time forming a small quantity of ferrous oxid, ferric sulfate and ferrous sulfate, and ferrous compounds which are oxidized to a ferric state by the addition of an oxidizing agent such as manganese dioxid, ($MnO_2$), during the leaching following the "sulfate roast". The ferric compounds leave the solution on hydrolysis as ferric hydroxid, taking with them by absorption, any arsenic, antimony, selenium, tellurium, etc., present in solution.

If it is desired to prevent the accumulaaion of sulfuric acid ($SO_4$) in a cyclic process, the sulfate roast may be continued at a temperature sufficiently high to break up such part or amount of the zinc sulfate as may be desired into zinc oxid, soluble in dilute sulfuric acid.

After the "sulfate roast", the zinc is recovered by any standard method of hydrochemical extraction.

Any uncombined zinc values present after the "sulfate roast" may be dissolved by adding a small quantity of sulfuric acid to the leach, or may be dissolved by regenerated electrolyte.

In the case of zinc ores into the composition of which iron does not enter sufficiently to effect a reaction, it may be necessary to add a catalyst such as ferric oxid, or a compound of iron which will yield ferric oxid, during the "sulfating roast", for hastening the decomposition and recombination of the zinc compounds.

In explanation of the invention we have shown a diagrammatic flow sheet of a plant suitable for the hydrochemical extraction of zinc according to this process.

The ore or concentrate is roasted in a furnace in an atmosphere of air, at a suitable temperature to convert as much as possible of the soluble zinc mineral into zinc compounds. This furnace we have designated the "oxidizing roaster".

The calcine from the oxidizing roaster is delivered into the "neutral pachuca" where it meets a flow of partly neutralized electrolyte. In this pachuca the calcine and partly neutralized electrolyte are violently agitated to complete the neutralization, and the contents of the pachuca are then passed to the "neutral classifier", where the coarse solids are separated from the liquid and caused to take a direction to the "acid pachuca".

From the neutral classifier the liquid passes to the "neutral thickeners", where the fine solids and slimes are separated from it and take a direction to the acid pachuca.

From the neutral thickeners the liquid passes to the "precipitating pachuca," where the copper, cadmium and other impurities present in the liquid are precipitated, and from there to the "filters," where it is clarified before entering the "electrolyte storage tank."

From the electrolyte storage tank the purified liquid now termed the electrolyte is fed to the electrolytic cells, where zinc is deposited as metallic zinc, and the acid solvent is regenerated and passes to the "acid storage tank."

From the acid storage tank the regenerated acid solvent passes to the "acid pachuca," where it meets the flow of coarse and fine solids and slimes separated from the liquid by the neutral classifier and neutral thickeners, and becomes partly neutralized by the soluble zinc values therein.

From the acid pachuca, the partly neutralized electrolyte and these solids pass to the "acid classifier" which separates the coarse solids out of the liquid and causes them to take a direction to the "residue."

From the acid classifier the liquid passes to the "acid thickeners," where the fine solids and slimes are separated from it to take a direction to the "residue," and then passes to the neutral agitator where it meets the fresh calcine from the oxidizing roaster and becomes neutralized before starting again the cycle of the process.

From the "residue" the leached solids are taken to the "sulfating roaster" and heated in an atmosphere of water vapor, sulfur dioxid and oxygen, or sulfur dioxid and air, to a temperature up to 1200° F. and in the presence of a catalyst. During the roast the zinc oxid compounds insoluble in the electrolyte of the previous leach are converted into zinc compounds soluble in dilute acid and/or water.

The calcine from the "sulfating roaster" then passes to the "sulfate pachuca," where it is met by a flow of water, or by a portion of the overflow from the acid, or the neutral thickeners, together with such regenerated electrolyte as may be necessary to dissolve any zinc values soluble in this medium, and it is here that manganese dioxid is added to oxidize the ferrous compounds to a ferric state.

From the "sulfating pachuca" the liquid flows through a battery of "sulfate thickeners," to the "neutral pachuca" to meet the fresh calcine from the oxidizing roaster and the partly neutralized electrolyte from the acid thickeners, and the solids go to the dump or to the next process for the recovery of the other values.

A marmatite ore containing 56.8% zinc, 10% iron, and 33.2% sulfur, treated by this process yielded on the oxid roast 74.2% of its zinc content soluble in dilute sulfuric acid, ($H_2SO_4$), and 25.2% zinc ferrite, containing 8.2% zinc oxid and 17% ferric oxid, insoluble in this solution. This calcine was then leached in dilute sulfuric acid, ($H_2SO_4$), and yielded all of the soluble zinc content present. The residue was then roasted in an atmosphere of sulfur dioxid and air, during which the zinc ferrite was converted into zinc sulfate, soluble zinc oxid and ferric oxid. The soluble zinc content was recovered, the final analysis of the residue showing only 0.8% of the original zinc content, or a total recovery of 99.2%.

The term "residue" as used throughout the description of the process and in the claims is intended to include in its meaning leached residues from electrolytic zinc processes, retort residues from retort zinc plants, residues from Wetherill grates and other zinc fuming operations, blast furnace slags and all that class of material containing oxidized zinc compounds in combinations which are insoluble in dilute sulfuric acid, ($H_2SO_4$), and the terms minerals and ores are intended to include in their meaning all sulfids, carbonates, and silicates containing zinc compounds soluble and/or insoluble, in dilute sulfuric acid.

What we claim is:

1. A process for treating zinc ores, concentrates and residues, which consists of oxidizing the zinc values, extracting the soluble zinc, and then heating the residue containing zinc values in insoluble combinations in a sulfating atmosphere to convert the zinc values into soluble zinc compounds.

2. A process for treating zinc ores, concentrates and residues, which consists of oxidizing the zinc content, dissolving the soluble zinc in dilute sulfuric acid ($H_2SO_4$), heating the residue containing zinc in insoluble combinations in a sulfating atmosphere to convert the zinc into soluble zinc compounds, and then extracting the zinc.

3. A process for treating zinc ores, concentrates and residues which consists of oxidizing the zinc content, extracting the soluble zinc, heating the residue containing zinc in insoluble combinations in a sulfating atmosphere in the presence of a catalyst to convert the zinc into soluble zinc compounds and then extracting the zinc.

4. A process for treating zinc ores, concentrates and residues which consists of oxidizing the zinc content, extracting the soluble zinc, heating the residue containing zinc in insoluble combinations in a sulfating atmosphere in the presence of ferric oxid to convert the zinc into soluble zinc compounds, and then extracting the zinc.

5. A process for treating zinc ores, concentrates and residues which consists of oxidizing the zinc content, extracting the soluble zinc, heating the residue containing zinc in insoluble combinations in a sulfating atmosphere to form soluble zinc compounds and dissolving these soluble zinc compounds in the presence of an oxidizing agent.

6. A process for the treatment of zinc ores, concentrates and residues, which consists of oxidizing the zinc content, extracting the soluble zinc, heating the residue containing zinc in insoluble combinations in a sulfating atmosphere to convert the zinc into zinc sulfate, and extracting the zinc as metallic zinc.

7. A process for the treatment of zinc ores, concentrates and residues which consists of oxidizing the zinc content, extracting the soluble zinc, heating the residue containing zinc in insoluble combinations in a sulfating atmosphere to convert the zinc into zinc sulfate and then heating to form zinc oxid.

Trail, B. C., March 20th, 1920.
FREDERICK ERIC LEE.
ARTHUR LIONEL McCALLUM.
SELWYN GWILLYM BLAYLOCK.
Signed, sealed and delivered in the presence of—
 Annie MacRay,
 Charles H. Riches.